United States Patent [19]

Druliner et al.

[11] Patent Number: 5,086,137
[45] Date of Patent: Feb. 4, 1992

[54] POLYMERIZATION OF SELECTED VINYL MONOMERS

[75] Inventors: Joe D. Druliner, Newark, Del.; Michael Fryd, Moorestown, N.J.

[73] Assignee: E. I. Du Pont de Nemours and Company, Wilmington, Del.

[21] Appl. No.: 562,982

[22] Filed: Aug. 6, 1990

[51] Int. Cl.⁵ .................................. C08F 4/04
[52] U.S. Cl. ................... 526/208; 526/214; 526/217; 526/219; 526/236; 526/295; 526/317.1; 526/320; 526/328; 525/257; 525/259; 525/260
[58] Field of Search ............ 526/214, 219, 208, 329.7, 526/236, 217; 525/257, 260, 262, 244, 242

[56] References Cited

U.S. PATENT DOCUMENTS

| | | | |
|---|---|---|---|
| 2,376,963 | 5/1945 | Garvey | 260/84.5 |
| 2,865,903 | 12/1958 | Seed | 260/94.9 |
| 4,404,345 | 9/1983 | Janssen | 526/206 |
| 4,761,360 | 8/1988 | Sato | 430/138 |

OTHER PUBLICATIONS

R. T. Morrison and R. N. Boyd, Organic Chemistry, 3rd Ed, pp. 209-219; Allyn and Bacon, Boston, 1973.
C. Walling, Free Radical in Solution, John Wiley & Sons, Inc., N.Y., 1957, pp. 518-519.
W. E. Bachmann, et al., Organic Reactions, vol. II, John Wiley & Sons, Inc., N.Y., 1944, pp. 226-230.

Primary Examiner—Joseph L. Schofer
Assistant Examiner—M. Nagumo

[57] ABSTRACT

A process in which selected vinyl monomers, such as acrylic esters and acids, and chloroprene are polymerized by contacting them with an aryl diazotate or a metal cyanate in the presence of certain halogenated organic compounds. The process is especially useful for preparing block copolymers.

25 Claims, No Drawings

POLYMERIZATION OF SELECTED VINYL MONOMERS

FIELD OF INVENTION

This invention concerns a process for the polymerization of selected vinyl monomers, by contacting a vinyl monomer with an aryl diazotate or a cyanate, and a halogenated nitrile, ester or ketone.

BACKGROUND OF THE INVENTION

U.S. Pat. No. 4,761,360 describes a light sensitive material containing a silver halide, a reducing agent, a polymerizable compound (vinyl monomer) and a silver diazotate. This mixture is reported to be stable (indeed it is said to be an advantage) until the material is exposed to light, and then heated, at which time the vinyl monomer is polymerized. U.S. Pat. No. 4,761,360 differs from the instant process as the instant process is not light catalyzed and a silver halide is not present.

C. Walling, Free Radical in Solution, John Wiley & Sons, Inc., New York, 1957, pp. 518-519 and W. E. Bachmann and R. A. Hoffman, in R. Adams, Ed., Organic Reactions, Vol. II, John Wiley & Sons, Inc., New York, 1944, pp. 226-230 speculate that aryldiazohydroxides, which are said to be in equilibrium with their sodium salts when in contact with sodium hydroxide, decompose readily at room temperature to give free radicals.

It is the object of the present invention to provide a method for the polymerization of selected vinyl compounds, to produce polymers useful as molding resins and coatings. In addition, when the instant process is used, the polymers thereby produced often have the unusual property of being able to induce the further polymerization of vinyl monomers, even if the "original" polymerization was completed before the additional vinyl monomer is added. This is advantageous to produce block copolymers, which themselves have useful properties (infra).

SUMMARY OF THE INVENTION

A process for the polymerization of vinyl monomers is disclosed, comprising, contacting
(a) a vinyl monomer selected from the group consisting of acrylic acids, acrylic esters, and chloroprene;
(b) a cyanate of the formula $M^{+n}(OCN)_n$, or a diazotate of the formula $Ar-N=N-O^- \ 1/nM^{+n}$ wherein:
n is an integer that is the ionic charge on M;
M is a metal ion or a tetrahydrocarbylammonium ion; and
Ar is an aryl or substituted aryl group; and
(c) N-chlorosuccinimide, N-bromosuccinimide, or a halogenated compound of the formula

wherein:
Y is selected from the group consisting of

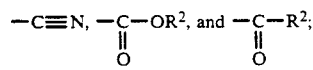

X is selected from the group consisting of chlorine, bromine and iodine;
each $R^1$ is independently selected from the group consisting of hydrogen, hydrocarbyl, substituted hydrocarbyl, Y, and X; and
each $R^2$ is independently hydrocarbyl or substituted hydrocarbyl.

DETAILS OF THE INVENTION

Among the vinyl monomers useful in the instant process are acrylic acids and esters. By the term acrylic is meant a compound of the formula

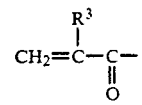

wherein the open valence is connected to an hydrocarbyloxy or substituted hydrocarbyloxy group to form an ester, or a hydroxy group to form an acid. The group $R^3$ is an alkyl group containing up to 4 carbon atoms or hydrogen. Preferred $R^3$ groups are methyl and hydrogen.

Preferred acrylic monomers are acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, and 2-hydroxyethyl methacrylate.

By the term "substituted hydrocarbyl(oxy)" herein is meant a hydrocarbyl(oxy) group that contains one or more substituents that do not interfere with the polymerization process. The substituents may be between hydrocarbyl segments, such as ether and amino.

Examples of other suitable substituents include, but are not limited to fluoro, keto (oxo), ester, amido, silyl, and the like.

Chloroprene is 2-chloro-1,3-butadiene.

The cyanates and diazotates used herein are metal salts. By the term "substituted" aryl herein is meant an aryl group that contains one or more substituents that do not interfere with the polymerization process. The substituents may be between hydrocarbyl segments, such as ether and amino. Examples of other suitable substituents include, but are not limited to fluoro, keto (oxo), ester, amide, silyl, alkyl, cycloalkyl, and the like. It is preferred if the aryl group is substituted with one or more electron withdrawing substituents. An electron withdrawing substituent has a so-called Hammett Constant of about 0.2 or more (for a listing of Hammett Constants, see H. Jaffe, Chem. Rev., vol. 53, pg. 222-223 (1953), which is hereby included by reference). Especially preferred substituents are nitro and nitrile. Especially preferred aryl groups are p-nitrophenyl and p-cyanophenyl. Preferred metal ions for the cyanate and diazotate salts are the alkali metal ions and tetrahydrocarbyl ammonium ions, especially sodium and potassium.

The halogenated compounds useful in the present process are often referred to as alpha-halogenated esters, ketones, and nitriles. Preferred halogens (the group X) are chlorine and bromine. Useful halogenated compounds include, but are not limited to, alkyl esters of 2-bromoisobutyric acid, alkyl esters of 2-chloroisobutyric acid, ethyl 2-chloroisobutyrate, ethyl 2-iodoisobutyrate, ethyl 2-bromoisobutyrate, diethyl 2-bromomalonate, bromomethyl p-nitrophenyl ketone, 2-bromoisbutyronitrile, methyl 2-bromoacetate, phenyl 2-phenyl-2-chloroacetate, n-hexyl-2-chlorooctoate, and 2-bromomalononitrile.

The process may be run neat (no additional compounds added), or in a solvent, emulsion or suspension. No matter how the reaction is run, it is important that at least some of each ingredient be present in a single phase, at least to start the polymerization. For example, when the process is run neat, the diazotate, which is a salt, may not be soluble in the neat reaction medium, which normally is mostly vinyl monomer. Thus, the diazotate may be solublized by the addition of small amounts of so-called crown ethers, which are known to those skilled in the art to solublize ionic compounds in nonpolar solvents. Other well known methods may be used. By a solvent is usually meant a compound that can dissolve the monomer, polymer, and at least a small amount of the halogenated compound and diazotate, although, for example, the solvent may only dissolve small amounts of polymer. Small amounts of compatiblizing compounds, such as methanol, acetone, or tetrahydrofuran, may also be useful. The process may be run in emulsion or suspension, preferably aqueous emulsion and aqueous suspension. These various methods are illustrated in the examples.

The process is run at from about $-20°$ C. to about $120°$ C., preferably about $0°$ C. to about $60°$ C., and most preferably about $10°$ C. to about $40°$ C. During rapid polymerization, cooling may be necessary to control the temperature. It is preferred to exclude oxygen, a convenient method to do this is to use an inert atmosphere such as nitrogen. The use of mild agitation is preferred, especially if the ingredients and/or products form more than one phase.

It is possible with this process to prepare block copolymers. By block copolymer is meant "... a polymer comprising molecules in which there is a linear arrangement of blocks. A block is defined as a portion of a polymer molecule in which the monomeric units have at least one constitutional or configurational feature absent from adjacent portions. In a block copolymer the distinguishing feature is constitutional, i.e., each of the blocks comprises units derived from a characteristic species of monomer." (Quotation from H. Mark, et al., Encyclopedia of Polymer Science and Engineering, John Wiley and Sons, New York, 1985, vol. 2, pg. 324.) Block copolymers are produced by sequential addition of monomers. That is, a block is started with one or more monomers. When those monomers are used up (polymerized), a second monomer(s) is added to make the next block.

This step can be repeated to make multiblock polymers. Block polymers are a preferred product of this process.

In the following Examples, the following abbreviations are used:
DMF—N,N-dimethylformamide
EHMA—2-ethylhexyl methacrylate
HEMA—2-hydroxyethyl methacrylate
MAA—methacrylic acid
MeOH—methanol
MMA—methyl methacrylate
Mn—number average molecular weight
Mw—weight average molecular weight
P—the polymer of the monomer whose acronym follows the P
Phor $\phi$—phenyl or phenylene
THF—tetrahydrofuran.

Typical Experimental Procedure for Examples in Tables I, II, III

EXAMPLE 5

To a 3 ml glass vial A, containing a Teflon ®-coated magnetic stir bar, was charged 0.0195 g (0.103 mmole) p-$O_2N\phi N=NONa$. The vial A was sealed with a Teflon ®-coated rubber septum by means of a plastic screw cap and 22 gauge stainless steel needles were used to pass $N_2$ through the vapor space for about 15 minutes. A second 3 ml glass vial B was charged with 1.07 g (10 mmole) MMA which had been passed through neutral alumina to remove radical inhibitors, 0.15 ml (1.0 mmole) ethyl-2-bromoisobutyrate, and 0.2 ml methanol. The vial B was similarly sealed and $N_2$ purged for about 15 minutes. At time zero, the liquid from vial B was drawn up by syringe and injected into vial A with rapid stirring. The reaction mixture in vial A was stirred for about 20 hours. A liquid product sample of about 0.5 ml was combined with about 0.25 ml $CD_2Cl_2$ and was analyzed by $^1$HNMR. A ratio of peak integrals at ~3.6 ppm

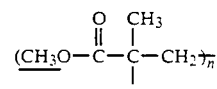

for PMMA/~3.7 ppm

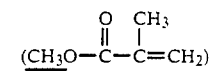

for MMA was about 54/46, indicating a % conversion of about 54%. A sample of the product, vacuum stripped (~0.02 mm) to remove unreacted MMA, was analyzed by GPC and gave the following numbers:

$M_w=311,000$, $M_n=70,500$, and PD=4.41.

For examples in which $H_2O$ was a co-solvent, the $H_2O$ was mixed with the p—$O_2N\phi N=NONa$, was $N_2$-purged, and the $H_2O$ solution injected into remaining liquids.

EXAMPLE 27

A 5-l flask was charged with 2000 g of chloroprene, 1 g of ethyl 2-bromoisobutyrate, 60 g of a disproportionated rosin (Resin 90 ®), 4.4 g of dodecylmercaptan, 1920 g of water, 8 g of Lomar ® PW (a formaldehyde-naphthalene sulfonic acid condensate), 3 g of sodium sulfite, and 9.2 g of sodium hydroxide, followed by stirring to emulsify under a nitrogen blanket. Polymerization was initiated by adding 9 ml of a 1% aq. initiator solution of p—$O_2N$—$C_6H_4$—$N=N$—ONa, when the specific gravity of the emulsion measured by a hydrometer increased from 0.967 to 0.972. The addition of the initiator solution was continued every 15 minutes, which resulted in sustaining chloroprene polymerization, as indicated by a rise in specific gravity, until reaching a total addition of 88 ml of the initiator solution, when the gravity reading was 1.082. The chloroprene conversion was 85.6% and the total solids concentration was 43.2%. The polymer was isolated by the usual freeze-roll process to give a solid polychloroprene (1430 g) of a Mooney viscosity at 100° C. of 79.

EXAMPLE 28

Block Copolymer of Butyl Acrylate and Methyl Methacrylate in Emulsion

A one liter four-necked flask, equipped with a mechanical stirrer, condenser, two dropping funnels, a thermometer and a nitrogen inlet, was charged with 130 gm of deionized water, 14 gm butyl acrylate, 1 gm of 30% aqueous solution of sodium lauryl sulfonate (Duponol®) and 0.5 gm ethyl bromoisobutyrate. The contents of the flask were vigorously purged with nitrogen at room temperature for 45 minutes at the end of which time a solution of 0.5 gm sodium p-nitrophenyl diazotate in 12 gm of deionized water were added to the flask in one shot. After 35 minutes the reaction mixture began to exotherm peaking at 25.4° C. (or 3.7° C. rise) over a 50 minute period. The milky-orange reaction mixture was stirred for an additional hour, at which time 50 gm of butyl acrylate and a solution of 2 gm of Duponol® (E. I. du Pont de Nemours and Company, Wilmington, Del.) in 20 gm of deionized water were added simultaneously over a 1 hour period. The reaction mixture started to exotherm again during the addition reaching a peak of 37.5° C. (a 14.4° C. rise) 17 minutes after the end of the addition. One hour after the exotherm the monomer was 90% converted and an additional two charges consisting of 50 gm of methyl methacrylate and 2 gm of Duponol® dissolved in 30 gm of deionized water were added over 1 hour. The reaction mixture exothermed again rising to 26.5° C. (a 2.2° C. rise) 2 hours and 25 minutes after the end of the second addition. The reaction mixture was allowed to stir for another hour at which point the conversion was 82% of the total monomer. The final product was a pale beige dispersion which when drawn down on glass and baked for 10 minutes at 120° C. gave a clear yellow, hard flexible film with two Tg's at $-48°$ C. and $+93°$ C.

TABLE I

| Ex. | $\underset{\text{Br,}}{\overset{\text{CO}_2\text{Et}}{\times}}$ mmoles | diazotate | mmoles | Monomer, | mmoles | Co-Solvent | Co-Solv (cc)/ Monomer (cc) | Time | % Conv. $^1$H NMR | % Conv. By Wt. | $M_n$ | $M_w$ |
|---|---|---|---|---|---|---|---|---|---|---|---|---|
| 1 | 1.0 | p-O$_2$NϕN=NONa | 0.1 | MMA | 5 | — | — | 16 hr | 0 | — | | |
| 2 | 0.69 | p-O$_2$NϕN=NONa | 0.085 | MMA | 2.3 | — | — | 68 hr | 89 | — | 29,000 | 182,000 |
| 3 | 0.50 | p-O$_2$NϕN=NONa | 0.052 | HEMA | 5.2 | — | — | 16 hr | — | 85 | | |
| 4$^a$ | 4.0 | p-O$_2$NϕN=NONa | 3.97 | MMA | 40 | H$_2$O | 0.19/1 | 1 hr | — | 7.6 | 16,000 | 66,900 |
| | | | | | | | | 3 hr | — | 42.1 | 19,300 | 52,500 |
| | | | | | | | | 4 hr | — | 47.6 | 21,000 | 53,900 |
| | | | | | | | | 5 hr | — | 80.4 | 29,300 | 82,300 |
| 5 | 1.0 | p-O$_2$NϕN=NONa | 0.10 | MMA | 10 | MeOH | 0.2/1 | 20 hr | 54 | — | 70,500 | 311,000 |
| 6 | 1.0 | p-O$_2$NϕN=NONa | 0.10 | MMA | 10 | THF | 0.5/1 | 4 hr | 34 | — | | |
| 7$^b$ | 1.0 | p-O$_2$NϕN=NONa | 0.10 | MMA | 10 | H$_2$O | 0.2/1 | 4 hr | — | 47 | 20,800 | 51,700 |
| 8 | 1.0 | p-NC-ϕN=NONa | 0.10 | MMA | 10 | H$_2$O | 0.23/1 | 17 hr | 50 | — | 7,240 | 29,700 |
| 9$^c$ | 0.25 | p-O$_2$NϕN=NON$_a$ | 0.025 | EHMA | 2.5 | H$_2$O | 8.9/1 | 16 hr | — | 94 | 104,000 | 504,000 |
| 10 | 1.0 | p-O$_2$NϕN=NON$_a$ | 0.10 | MAA | 10 | — | — | 17 hr | 50 | — | | |

$^a$Run in 30 cc crimp cap vial
$^b$Run in dark
$^c$0.23% Duponol® surfactant in H$_2$O

TABLE II

| Ex. | Component (c) | mmoles | Component (b) | mmoles | MMA, mmoles | Co-Solvent | Co-Sol. (V)/ Monomer (V) | Time | % Conv. 1H NMR | % Conv. By Wt. | $M_n$ | $M_w$ |
|---|---|---|---|---|---|---|---|---|---|---|---|---|
| 11 | CO₂Et / NO₂ (X) | 0.1 | p-O₂NPhN=NONa | 0.10 | 10.3 | DMF | 0.1/1 | 66 hr | 15 | — | 86,000 | 347,000 |
| 12 | CO₂Et / I (X) | 0.08 | p-O₂NPhN=NONa | 0.10 | 10.0 | H₂O | 0.23/1 | 19 hr | — | ~10 | | |
| 13 | CO₂Me / Cl (X) | 1.0 | p-O₂NPhN=NONa | 0.10 | 10.0 | H₂O | 0.2/1 | 18 hr | 47 | — | 9,130 | 38,500 |
| 14 | Br–C(CO₂Et)(CO₂Et) | 1.1 | p-O₂NPhN=NONa | 0.12 | 10.0 | H₂O | 0.23/1 | 19 hr | — | solid | 20,700 | 244,000 |
| 15ᵃ | H–C(CO₂Et)(CO₂Et)–Br | 5.0 | p-O₂NPhN=NONa | 0.5 | 50.0 | H₂O | 0.21/1 | 6 hr | — | 53 | 11,900 | 76,000 |
| 16 | p-O₂Nφ-C(=O)-CH₂Br | 1.0 | p-O₂NPhN=NONa | 0.10 | 10.0 | H₂O | 0.2/1 | 17 hr | 48 | — | 12,100 | 42,400 |
| 17 | CN / Br (X) | 1.0 | p-O₂NPhN=NONa | 0.10 | 10.0 | H₂O | 0.23/1 | 18 hr | — | solid | 33,600 | 310,000 |
| 18 | H–C(CO₂Et)(CO₂Et)–Br | 1.0 | NaOCN | 1.0 | 10.0 | DMF | 0.23/1 | 5 days | — | semi-solid | 12,900 | 78,600 |
| 19 | NCSᵇ | 0.1 | NaOCN | 0.1 | 10.0 | H₂O | 0.2/1 | 16 hr | 20 | — | 17,800 | 70,500 |
| 20 | NCS | 0.1 | NaOCN | 0.1 | 5.0 | THF/H₂O | 0.5/0.2/0.53 | 18 hr | 20 | — | 3,880 | 19,600 |
| 21 | NCS | 0.05 | p-O₂NPhN=NONa | 0.1 | 5.0 | H₂O | 0.2/1 | 16 hr | 28 | — | 28,900 | 88,600 |

ᵃRun in 30 cc crimp cap vial
ᵇRun at 35° C.

TABLE III

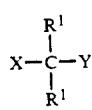

| Ex. | Br, mmoles | p-O$_2$NPhN=NONa, mmoles | monomer | mmoles | Co-Solvent | Co-Solv.(v)/Monomer(v) | Time | % Conv. $^1$H NMR | % Conv. By Wt. | $M_n$ | $M_w$ |
| --- | --- | --- | --- | --- | --- | --- | --- | --- | --- | --- | --- |
| 22$^a$ | 1.0 | 0.1 | MA | 10 | — | — | 2 hr | — | 30 | — | — |
| 23$^b$ | 1.0 | 0.1 | MA | 10 | — | — | <5 min | — | solidified | — | — |
| 24$^c$ | 0.8 | 0.08 | MA | 2.5 | THF | 1.1/1 | 1 hr | — | 48 | — | — |
| 25$^d$ | 1.0 | 0.1 | MMA | 10 | — | — | 20 hr | 23 | — | 22,800 | 180,000 |
| 26$^e$ | 1.0 | 0.1 | MMA | 10 | — | — | 20 hr | 22 | — | 20,200 | 61,600 |

$^a$2 mmol polyethylene glycol (PEG)/mmol p-O$_2$PhN=NONa
$^b$1 mmol PEG/mmol p-O$_2$PhN=NONa
$^c$2.6 mmol PEG/mmol p-O$_2$PhN=NONa
$^d$10 mmol PEG/mmol p-O$_2$PhN=NONa
$^e$10 mmol (CH$_3$)$_4$NCl/mmol p-O$_2$PhN=NONa Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for the polymerization of vinyl monomers, comprising, contacting
   (a) a vinyl monomer selected from the group consisting of acrylic acids, acrylic esters, and chloroprene;
   (b) a cyanate of the formula $M^{+n}(OCN)n$, or a diazotate of the formula $Ar-N=N-O^-\ 1/nM^{+n}$ wherein:
   n is an integer that is the ionic charge on M;
   M is a metal ion or a tetrahydrocarbylammonium; and
   Ar is an aryl or substituted aryl group;
   (c) a halogenated compound of the formula

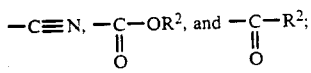

wherein
Y is selected from the group consisting of $-C\equiv N$, $-\underset{\underset{O}{\|}}{C}-OR^2$, and $-\underset{\underset{O}{\|}}{C}-R^2$;

X is selected from the group consisting of chlorine, bromine and iodine;
each $R^1$ is independently selected from the group consisting of hydrogen, hydrocarbyl, substituted hydrocarbyl, Y, and X; and
each $R^2$ is independently hydrocarbyl or substituted hydrocarbyl.

2. The process as recited in claim 1 wherein said vinyl monomer is acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, or 2-hydroxyethyl methacrylate.

3. The process as recited in claim 1 wherein said vinyl monomer is chloroprene.

4. The process as recited in claim 1 wherein said Ar group in said diazotate is p-nitrophenyl or p-cyanophenyl.

5. The process as recited in claim 1 wherein said M is an alkali metal ion or a tetrahydrocarbyl ammonium ion.

6. The process as recited in claim 5 wherein said alkali metal ion is sodium or potassium.

7. The process as recited in claim 5 wherein said vinyl monomer is acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, 2-hydroxyethyl methacrylate, or chloroprene.

8. The process as recited in claim 4 wherein said vinyl monomer is acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, 2-hydroxyethyl methacrylate, or chloroprene.

9. The process as recited in claim 1 wherein said (b) component is an alkali metal cyanate.

10. The process as recited in claim 9 wherein said vinyl monomer is acrylic acid, methacrylic acid, methyl acrylate, ethyl acrylate, butyl acrylate, methyl methacrylate, butyl methacrylate, 2-ethylhexyl methacrylate, phenyl acrylate, cyclohexyl methacrylate, 2-hydroxyethyl acrylate, 2-hydroxyethyl methacrylate, or chloroprene.

11. The process as recited in claim 1 wherein said X is chlorine or bromine.

12. The process as recited in claim 8 wherein said X is chlorine or bromine.

13. The process as recited in claim 10 wherein said X is chlorine or bromine.

14. The process as recited in claim 1 wherein said halogenated compound is alkyl esters of 2-bromoisobutyric acid, alkyl esters of 2-chloroisobutyric acid, ethyl 2-chloroisobutyrate, ethyl 2-iodoisobutyrate, ethyl 2-bromoisobutyrate, diethyl 2-bromomalonate, bromomethyl p-nitrophenyl ketone, 2-bromoisbutyronitrile, methyl 2-bromoacetate, phenyl 2-phenyl-2-chloroacetate, n-hexyl-2-chlorooctoate, or 2-bromomalononitrile.

15. The process as recited in claim 7 wherein said halogenated compound is alkyl esters of 2-bromoisobutyric acid, alkyl esters of 2-chloroisobutyric acid, ethyl 2-chloroisobutyrate, ethyl 2-iodoisobutyrate, ethyl 2-bromoisobutyrate, diethyl 2-bromomalonate, bromomethyl p-nitrophenyl ketone, 2-bromoisbutyronitrile, methyl 2-bromoacetate, phenyl 2-phenyl2-chloroacetate, n-hexyl-2-chlorooctoate, or 2-bromomalononitrile.

16. The process as recited in claim 8 wherein said halogenated compound is alkyl esters of 2-bromoisobutyric acid, alkyl esters of 2-chloroisobutyric acid, ethyl 2-chloroisobutyrate, ethyl 2-iodoisobutyrate, ethyl 2-bromoisobutyrate, diethyl 2-bromomalonate, bromomethyl p-nitrophenyl ketone, 2-bromoisbutyronitrile, methyl 2-bromoacetate, phenyl 2-phenyl-2-chloroacetate, n-hexyl-2-chlorooctoate, or 2-bromomalononitrile.

17. The process as recited in claim 10 wherein said halogenated compound is alkyl esters of 2-bromoisobutyric acid, alkyl esters of 2-chloroisobutyric acid, ethyl 2-chloroisobutyrate, ethyl 2-iodoisobutyrate, ethyl 2-bromoisobutyrate, diethyl 2-bromomalonate, bromomethyl p-nitrophenyl ketone, 2-bromoisbutyronitrile, methyl 2-bromoacetate, phenyl 2-phenyl-2-chloroacetate, n-hexyl-2-chlorooctoate, or 2-bromomalononitrile.

18. The process as recited in claim 1 which is run neat.

19. The process as recited in claim 1 which is carried out as an emulsion.

20. The process as recited in claim 19 wherein said emulsion is an aqueous emulsion.

21. The process as recited in claim 1 which is carried out as a suspension.

22. The process as recited in claim 21 wherein said suspension is an aqueous suspension.

23. The process as recited in claim 1 carried out at a temperature of about $-20°$ C. to about $120°$ C.

24. The process as recited in claim 23 wherein said temperature is about $0°$ C. to about $60°$ C.

25. The process as recited in claim 24 wherein said temperature is about $10°$ C. to about $60°$ C.

* * * * *